Oct. 16, 1923.
J. H. HOWARD
1,471,264
TIRE INFLATING APPARATUS FOR AUTOMOBILES
Filed Aug. 22, 1921    2 Sheets-Sheet 2
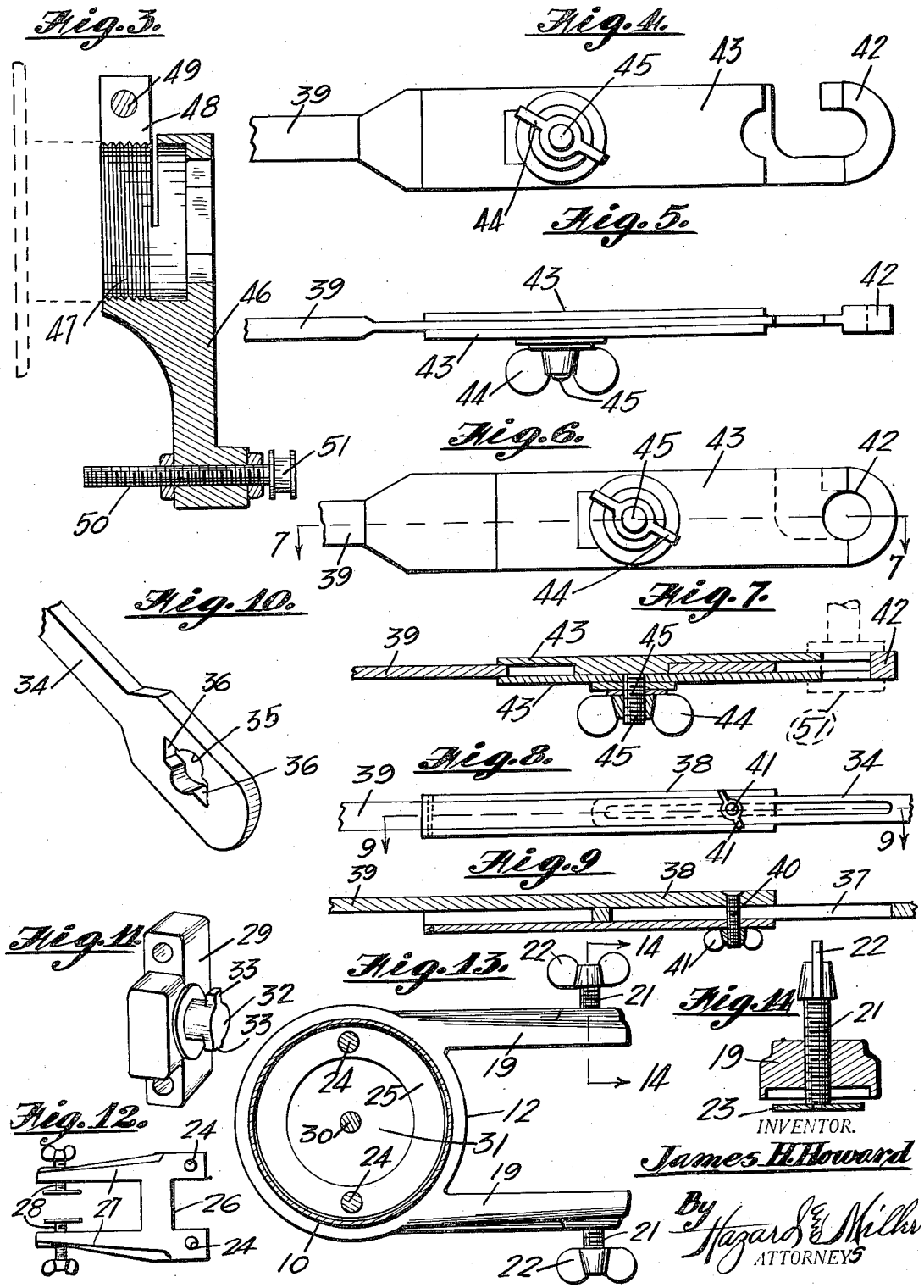
INVENTOR.
James H. Howard
By Hazard & Miller
ATTORNEYS Patented Oct. 16, 1923.

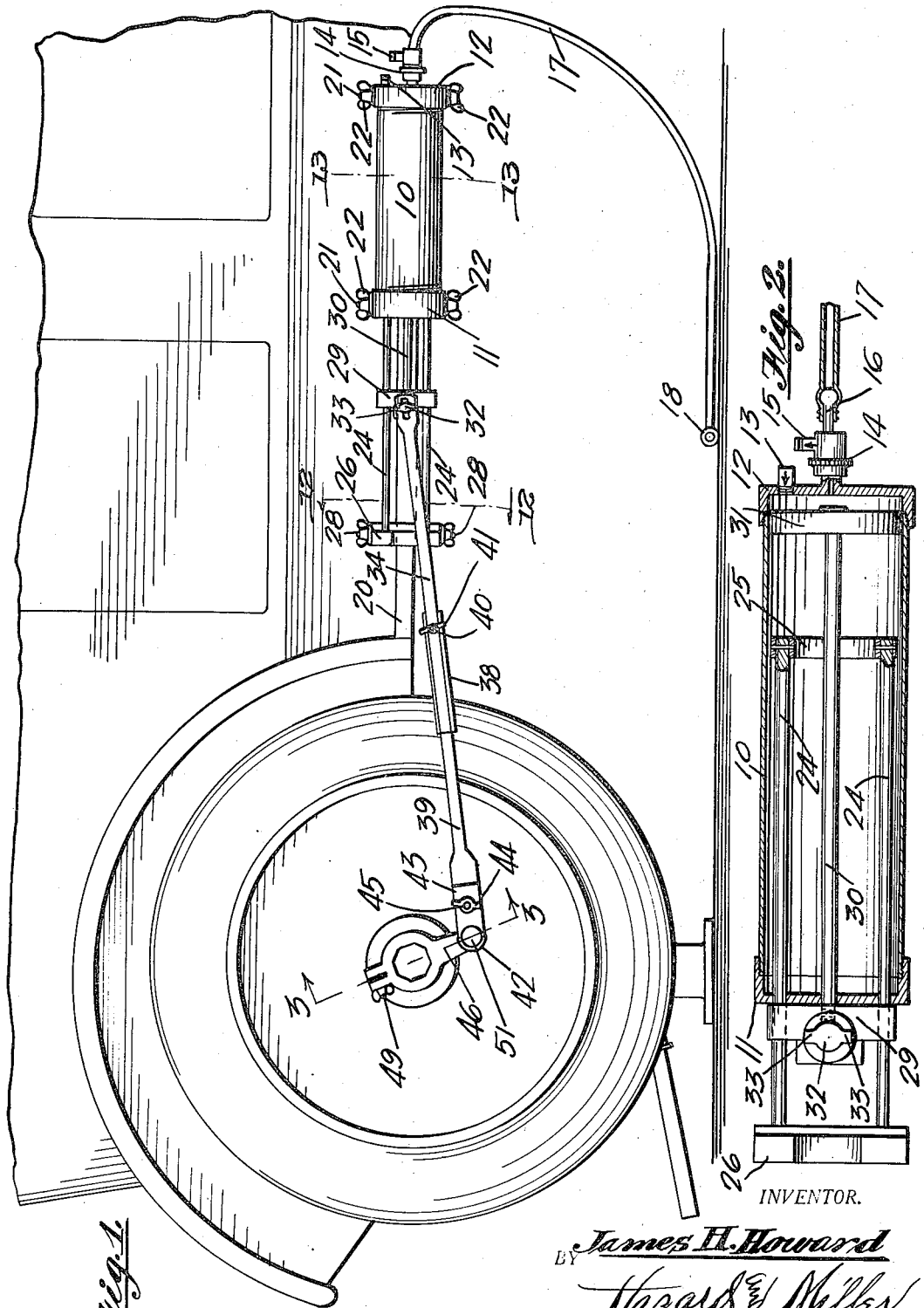

1,471,264

UNITED STATES PATENT OFFICE.

JAMES H. HOWARD, OF LOS ANGELES, CALIFORNIA.

TIRE-INFLATING APPARATUS FOR AUTOMOBILES.

Application filed August 22, 1921. Serial No. 494,238.

*To all whom it may concern:*

Be it known that I, JAMES H. HOWARD, a citizen of the United States, residing at Los Angeles, in the county of Los Angeles and State of California, have invented new and useful Improvements in Tire-Inflating Apparatus for Automobiles, of which the following is a specification.

My invention relates to a tire inflating apparatus of the type disclosed in my co-pending application filed February 3, 1921, Serial No. 442,180; the principal objects of my present invention being to generally improve upon and simplify the construction of the tire inflating device disclosed in my aforesaid application, as well as other similar types of inflating devices, to provide a relatively simple and practical power driven device that may be easily and quickly assembled for use, and which may be advantageously employed in very rapidly inflating pneumatic tires, such as are in general use upon motor vehicles.

Further objects of my invention are to provide a strong and substantial device that may be easily and quickly attached to the running board of a vehicle and likewise quickly connected to one of the driving wheels of the vehicle, and the operation of which latter is effective in operating the pump to compress and force air into a tire.

With the foregoing and other objects in view, my invention consists in certain novel features of construction and arrangement of parts that will be hereinafter more fully described and claimed and illustrated in the accompanying drawings, in which:

Figure 1 is an elevational view of a portion of a motor vehicle, and showing my improved inflating device in position for use thereupon.

Fig. 2 is a section taken lengthwise through the center of the pump cylinder forming a part of my improved inflating device.

Fig. 3 is an enlarged detail section taken approximately on the line 3—3 of Fig. 1.

Fig. 4 is an elevational view of the end of the connecting rod that is detachably connected to the hub engaging crank arm of the device.

Fig. 5 is a top plan view of the end of the connecting rod.

Fig. 6 is an elevational view of the end of the connecting rod with the parts thereof in closed position, or in position for engagement with the wrist pin on the hub cap engaging crank arm.

Fig. 7 is a horizontal section taken on the line 7—7 of Fig. 6.

Fig. 8 is an elevational view of the adjustably connected inner end portions of the members that form the connecting rod of the device.

Fig. 9 is a longitudinal section taken approximately on the line 9—9 of Fig. 8.

Fig. 10 is a perspective view of the end of the connecting rod that is detachably connected to the piston rod of the pump.

Fig. 11 is a perspective view of the block that is connected to the piston rod of the pump, and to which the connecting rod is applied when the parts are assembled for operation.

Fig. 12 is an enlarged cross section taken on the line 12—12 of Fig. 1.

Fig. 13 is an enlarged detail section taken on the line 13—13 of Fig. 1.

Fig. 14 is a detail section, still further enlarged, on line 14—14 of Fig. 13.

Referring by numerals to the accompanying drawings which illustrate a practical embodiment of my invention, 10 designates the cylinder of an air compressing pump, the ends thereof being closed by caps 11 and 12, and located in the latter is an inlet check valve 13, and an outlet check valve 14. The housing of this last mentioned valve is provided beyond the valve seat with an outlet 15 in which is located a vibratory reed or member that is adapted to be operated under a predetermined degree of air pressure, thus serving to give an audible signal when the predetermined air pressure has been pumped into a tire. Leading from valve housing 14 is a nipple 16, and connected thereto is one end of a flexible member 17, the opposite end thereof carrying an ordinary filling valve 18.

Formed integral with, or fixed to each cap 11 and 12 is a pair of outwardly projecting parallel arms, such as 19 that are adapted to occupy positions immediately above and beneath the vehicle running board 20, and screw seated in the outer ends of said arms are threaded shanks 21, the outer ends thereof being provided with wings 22, and the inner ends carrying discs 23 that are adapted to engage the running board 20 when the threaded shanks 21 are properly manipulated. The construction just described provides means for very firmly securing the pump cylinder end to the running board of the vehicle.

Arranged to slide through cap 11 is a pair of rods 24, the inner ends of which are connected to each other by a ring 25, and secured to the outer ends of said rods is a block 26 having a pair of laterally projecting arms 27 that occupy positions above and below the running board 20, and said arms being provided with clamping screws 28 that are adapted to engage the running board and firmly secure the block 26 thereto.

When the device is applied for use, rods 24 are withdrawn from the cylinder 10 until ring 25 occupies a position adjacent to cap 11, as illustrated in Fig. 1, and thus the withdrawn rods provide guides for a cross head block 29 to which is secured the outer end of a piston rod 30 and the inner end thereof carrying a piston 31.

Formed integral with block 29 is an outwardly projecting stud 32 on the outer portion of which is formed a pair of oppositely disposed lugs 33. Stud 32 is adapted to receive the end of a connecting rod member 34, and which end is provided with an aperture 35 through which lug 32 passes, and said aperture being provided on opposite sides with notches 36 which accommodate the lugs 33 when the parts are assembled for use. In applying the member 34 to block 29 said member must be moved into a vertical position to permit the lugs 33 to pass through the notches 36, and after such operation the member 34 is swung downwardly into a substantially horizontal plane, and when so positioned it is firmly secured to said block 29.

The end of member 34 opposite the end that is detachably connected to block 29 is provided with a longitudinally disposed slot 37, and said slotted inner end portion is adjustably seated in a housing 38 that is positioned on the inner end of a connecting rod member 39. Seated in the housing 38 is a threaded shank 40 that passes through the slot 37 in member 34, and mounted on the outer end of said threaded shank is a winged nut 41 which, when tightened, locks the member 34 in its adjusted position in housing 38.

The outer end of member 39 terminates in a hook 42, and arranged for sliding movement on the sides of said member adjacent to said hook are retaining plates 43 that may be locked to said member 39 by means of a winged nut 44 that is positioned on a threaded shank 45, and the latter being seated in one of said plates 43 and passing through an aperture in the other plate.

The inner end of a crank arm 46 is provided with an internally threaded recess 47 that is adapted to receive the threaded outer end of the hub of a vehicle wheel when the usual cap is removed therefrom, and the inner end of said crank arm adjacent to the threaded portion being provided with ears 48 that receive a clamping screw 49, and which latter, when tightened, is effective in locking the crank arm on the vehicle wheel hub.

Adjustably seated in the outer end of the crank arm 46 is a threaded shank 50 carrying on its outer end a flanged head 51, and which latter is adapted to be engaged by a hook 42 when the parts are properly assembled for use. After the hook 42 has been engaged on flanged head 51, the plates 43 are moved toward said hook thereby providing a detachable connection between the parts.

When properly assembled for use, the various parts of my improved power driven tire inflating device occupy the positions as illustrated in Fig. 1, with the pump cylinder secured to the running board of a vehicle, and with the guide rods 24 withdrawn from said cylinder, and the block 26 to which said guide rods are connected being secured to the running board.

The hub cap of one of the rear wheels is removed and crank arm 46 is positioned on the threaded end of the hub, and after the rear portion of the vehicle is jacked up so that the rear wheel clears the ground, the engine of the vehicle is started, with the result that the elevated rear wheel will be operated in the usual manner, and through the connecting rod comprising the parts 34 and 39, the piston 31 will be reciprocated within the cylinder 10, and which action forces air under pressure through the flexible tube 17 into the tire that is to be inflated.

When the pressure within the tire reaches a predetermined degree, the audible signal device 15 associated with valve housing 14 will produce a signal thereby warning the operator that the proper amount of air under pressure has been pumped into the tire.

The length of the connecting member comprising the parts 34 and 39 may be readily adjusted by proper manipulation of winged nut upon threaded shank 40, and which parts are effective in locking the members of the connecting rod to each others and the ends of said connecting rod may be easily and quickly applied to, or detached from, the stud on block 29 and the flanged head 51 that is carried by crank 46. Likewise the cylinder 10 may be easily and quickly applied to, or removed from, the vehicle running board, and when all of the parts have been detached they may be readily packed so as to occupy comparatively little space within a pocket or compartment in a vehicle.

The construction of the inflating device is relatively simple, and by its use the pneumatic tires of vehicles may be very quickly inflated to the desired degree.

It will be understood that minor changes in size, form and construction of the various parts of my improved tire inflating apparatus may be made and substituted for those herein shown and described without departing from the spirit of my invention, the scope of which is set forth in the appended claims.

I claim as my invention:

1. In a tire inflating apparatus, a cylinder, means on said cylinder for clamping it upon a fixed support, a piston and piston rod arranged for operation within said cylinder, a cross head secured to the outer end of the piston rod, guide rods for said cross head which guide rods are arranged to slide into the cylinder, means for securing the outer ends of said guide rods to a fixed support, and a connecting rod detachably connected to said cross head and adapted to be connected to a power driven member.

2. In a tire inflating apparatus, a cylinder, means on said cylinder for clamping it upon a fixed support, a piston and piston rod arranged for operation within said cylinder, a cross head secured to the outer end of the piston rod, guide rods for said cross head which guide rods are arranged to slide into the cylinder, means for securing the outer ends of said guide rods to a fixed support, and a crank arm pivotally connected to the outer end of said connecting rod and adapted to be detachably connected to a power driven member.

3. In a tire inflating apparatus, a pump cylinder, caps closing the ends thereof, and means for securing said cylinder at the side of a running board, said means comprising a pair of parallel arms projecting laterally from each cap, and clamping screws seated in all four of said arms.

4. In a tire inflating apparatus, a pump cylinder, a piston operating therein, a piston rod connected to said piston, a cross head secured to the outer end of said piston rod, guide rods arranged to slide into said cylinder and upon which the cross head is mounted, a block to which the outer ends of the guide rods are connected, and means for securing said block and said pump cylinder to a fixed support.

5. In a tire inflating apparatus, a pump comprising a cap with apertures for guide rods for a cross head block, a block supporting said guide rods, means for separately securing the same to a fixed support, a crank arm adapted to be detachably secured to the hub of a vehicle wheel, and an adjustable connecting rod arranged between said crank arm and the cross head block of the pump.

6. In a tire inflating apparatus, a pump comprising a cap with apertures for guide rods for a cross head block, a block supporting said guide rods, means for separately securing the same to a fixed support, a crank arm adapted to be detachably secured to the hub of a vehicle wheel, and an adjustable connecting rod having its ends detachably connected to said crank arm and to the cross head block of the pump.

In testimony whereof I have signed my name to this specification.

JAMES H. HOWARD.